(12) United States Patent
Hulick et al.

(10) Patent No.: US 7,246,922 B2
(45) Date of Patent: Jul. 24, 2007

(54) LAMP NOSE CONE

(75) Inventors: Kevin Hulick, Corvallis, OR (US); Anurag Gupta, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 43 days.

(21) Appl. No.: 11/236,910

(22) Filed: Sep. 28, 2005

(65) Prior Publication Data

US 2007/0070629 A1 Mar. 29, 2007

(51) Int. Cl.
*F21V 29/00* (2006.01)

(52) U.S. Cl. .................. 362/294; 362/264; 362/345

(58) Field of Classification Search ........ 362/293–294, 362/264, 373, 345; 353/97–98, 56
See application file for complete search history.

(56) References Cited

U.S. PATENT DOCUMENTS

| | | | |
|---|---|---|---|
| 3,806,236 A | 4/1974 | Downing | |
| 4,142,227 A | 2/1979 | Aikens | |
| 4,613,931 A | 9/1986 | Messinger | |
| 4,658,338 A | 4/1987 | Bertozzi | |
| 4,985,815 A | 1/1991 | Endo | |
| 5,172,975 A | 12/1992 | Parker | |
| 5,404,283 A | 4/1995 | Yantz et al. | |
| 5,791,770 A * | 8/1998 | Hoyt et al. | 362/294 |
| 6,210,024 B1 | 4/2001 | Shida | |
| 6,530,664 B2 | 3/2003 | Vanderwerf et al. | |
| 6,568,814 B2 | 5/2003 | Rodriguez, Jr. et al. | |
| 6,827,470 B2 | 12/2004 | McCullough et al. | |
| 6,844,993 B2 | 1/2005 | Fujimori et al. | |
| 6,899,444 B1 | 5/2005 | Biber et al. | |
| 7,111,962 B2 * | 9/2006 | Meguro et al. | 362/294 |
| 2002/0167818 A1 | 11/2002 | Yoneima | |

FOREIGN PATENT DOCUMENTS

EP 1164328 12/2001

* cited by examiner

*Primary Examiner*—Ali Alavi

(57) ABSTRACT

A nose cone for a projector lamp having a lamp burner and a reflector, includes a metal shell, having a rear edge configured to attach to a forward edge of the reflector, and configured to cooperate with the reflector to substantially enclose the lamp burner. The metal shell includes means for dissipating heat therefrom.

26 Claims, 6 Drawing Sheets

LAMP NOSE CONE

BACKGROUND

There are a variety of types of digital projection systems that have been developed and gained widespread use in recent years. Digital projection systems generally include a spatial light modulator for producing an image signal, and a light source to illuminate the light modulator and associated optical elements to project a desired image to a projection surface. Types of spatial light modulators currently in use for projection systems include liquid crystal display (LCD) systems (both reflective and transmissive), liquid crystal on silicon (LCOS) displays, and digital mirror devices (DMD), among others.

Recent technological and manufacturing advances have made digital projection systems increasingly popular and affordable. The ultra-high pressure (UHP) projector lamps in these projectors generate the majority of heat produced by the projection system. Management of this heat is one important aspect of the design of these systems. Excessive heat can damage sensitive electronic components of the projection system, or simply reduce the useful life of individual components or of the device as a whole. At the same time, a high illuminance projector lamp is usually required to attain a relatively high temperature in order to operate efficiently.

A variety of approaches have been taken to managing the heat associated with high output projector lamps. Fans and/or blowers are frequently used to provide a constant stream of cooling air onto the projector lamp. Unfortunately, with known systems a large quantity of heat is still dissipated from the lamp to the components within the projector. There is a need for additional systems and methods for capturing and removing heat from projector systems.

BRIEF DESCRIPTION OF THE DRAWINGS

Various features and advantages of the invention will be apparent from he detailed description which follows, taken in conjunction with the accompanying drawings, which together illustrate, by way of example, features of the invention, and wherein.

DETAILED DESCRIPTION

Figure 1:
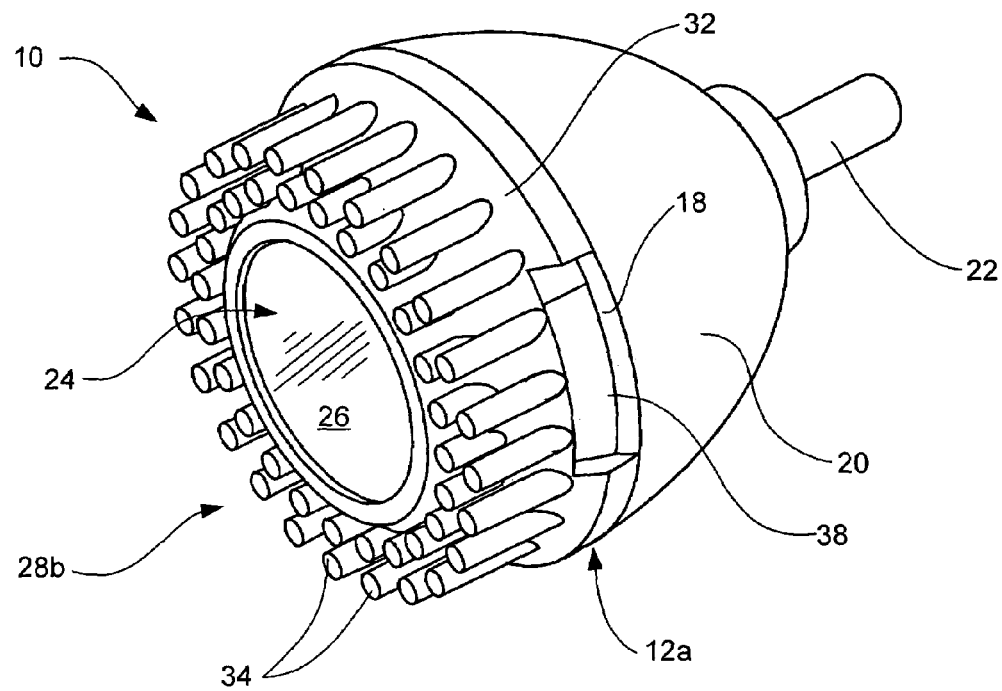
FIG. 1 is a perspective view of one embodiment of a projector lamp having a thermal nose cone.

Reference will now be made to exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the invention as illustrated herein, which would occur to one, skilled in the relevant art and having possession of this disclosure, are to be considered within the scope of the invention.

The ultra-high pressure (UHP) lamps in projectors, such as mercury-arc or xenon-arc lamps, generate the majority of heat for a projection system. Efficiently removing this heat from the system can allow the projector to be quieter, smaller, and/or brighter, and can also prolong its useful life.

Figure 8:
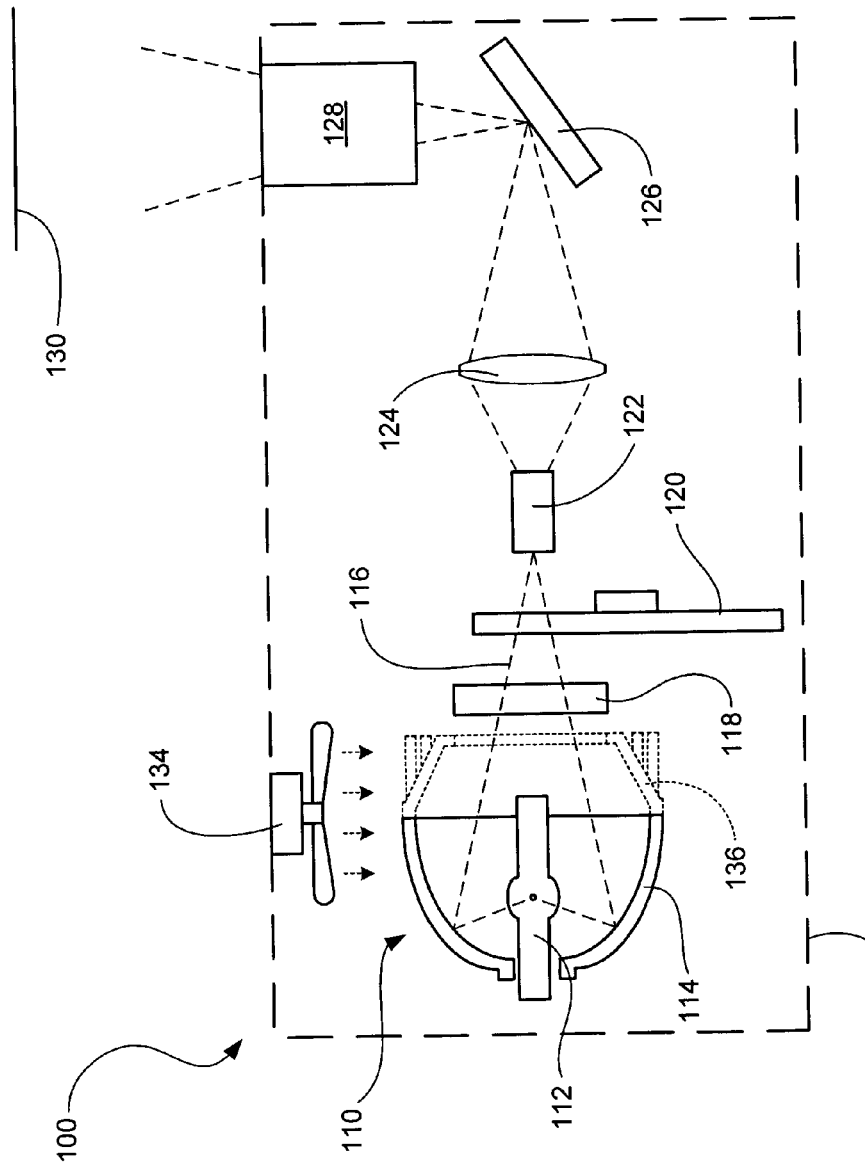
FIG. 8 is a schematic diagram of a projection system incorporating a UHP projector lamp having an embodiment of the invention.

Shown in FIG. 8 is a schematic diagram of one type of projection system 100. It will be apparent that the projection system depicted here is only one type, and that the present invention is compatible with a variety of types of projection systems in addition to that depicted. The projection system generally includes a projection lamp 110, which includes a lamp burner 112 and a curved reflector 114. Light from the lamp, represented by dashed lines 116, first passes through a UV/IR filter 118, which filters out ultraviolet and infrared light, and then passes through a color wheel 120 before entering an integrating rod 122. The color wheel has a plurality of color filter segments (not shown), such as red, green, and blue filters, and spins rapidly so as to cause the projected light to sequentially pass through the color filters, so as to produce the rapid sequence of red, green and blue light required for the color image.

The integrating rod 122 spatially integrates light from the lamp into a rectangular cross-section with uniform intensity, after which the light passes through illumination optics 124, which image the exit of the integrating rod onto the light modulator. The spatial light modulator 126 can be a liquid crystal device (LCD), liquid crystal on silicon (LCOS), a digital mirror device (DMD), or any other suitable light modulator. The light modulator modulates the light into the desired picture for each color element of the light, in order to produce the final image. The image projected or reflected from the light modulator passes through projection optics 128 and is then cast upon a screen 130 or other projection surface.

In projection systems of this sort, dissipating heat from the projector lamp 110 is a significant concern. The system components depicted in FIG. 8 are enclosed in a housing 132 (represented by dashed lines), which can be of plastic or metal, for example, or a combination of the two, and is typically made as compact as possible. The burner 112 of the lamp optimally operates at a temperature of around 800-900 deg. C. At this temperature, the burner emits a large amount of infrared radiation, which is absorbed by the lamp reflector 114 and other elements of the projection system 100, including the projector housing. As depicted in FIG. 8, a cooling fan or blower 134 can be provided and oriented to cause cooling air to pass over the lamp. This helps remove some heat through convection off of the surface of the burner and the lamp reflector, the heated air then being vented outside the projector housing. In some projector systems, a plastic nose cone 136 (shown in dashed lines) is provided on the front of the lamp reflector 114. This nose cone also heats up and emits radiation to the inside of the projector housing.

Unfortunately, this configuration still provides significant undesirable heating of the entire projector and its components. To more effectively deal with the heat from a projector lamp, the inventors have developed a lamp nose cone that is configured to be located at the exit of a projector lamp. The nose cone absorbs heat from the lamp burner and reflector, and from hot air around the burner. The configuration of the nose cone allows this heat to be efficiently transferred outside the projector housing, thus reducing heating and possible damage to or degradation of the projector components.

Figure 2:
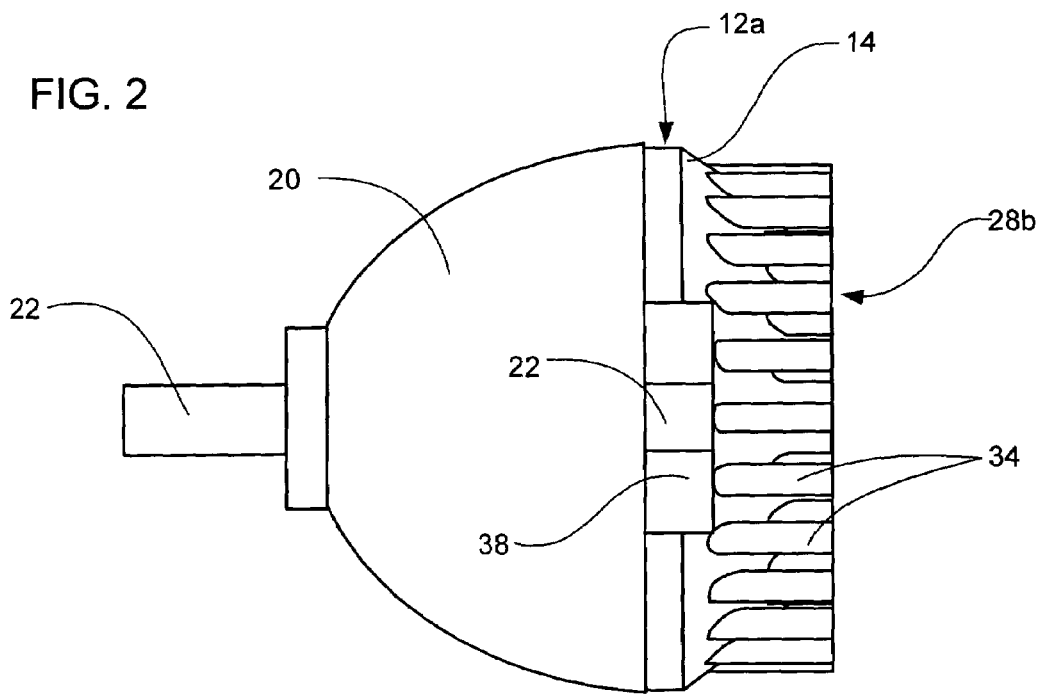
FIG. 2 is a side view of the projector lamp of FIG. 1.
Figure 3:
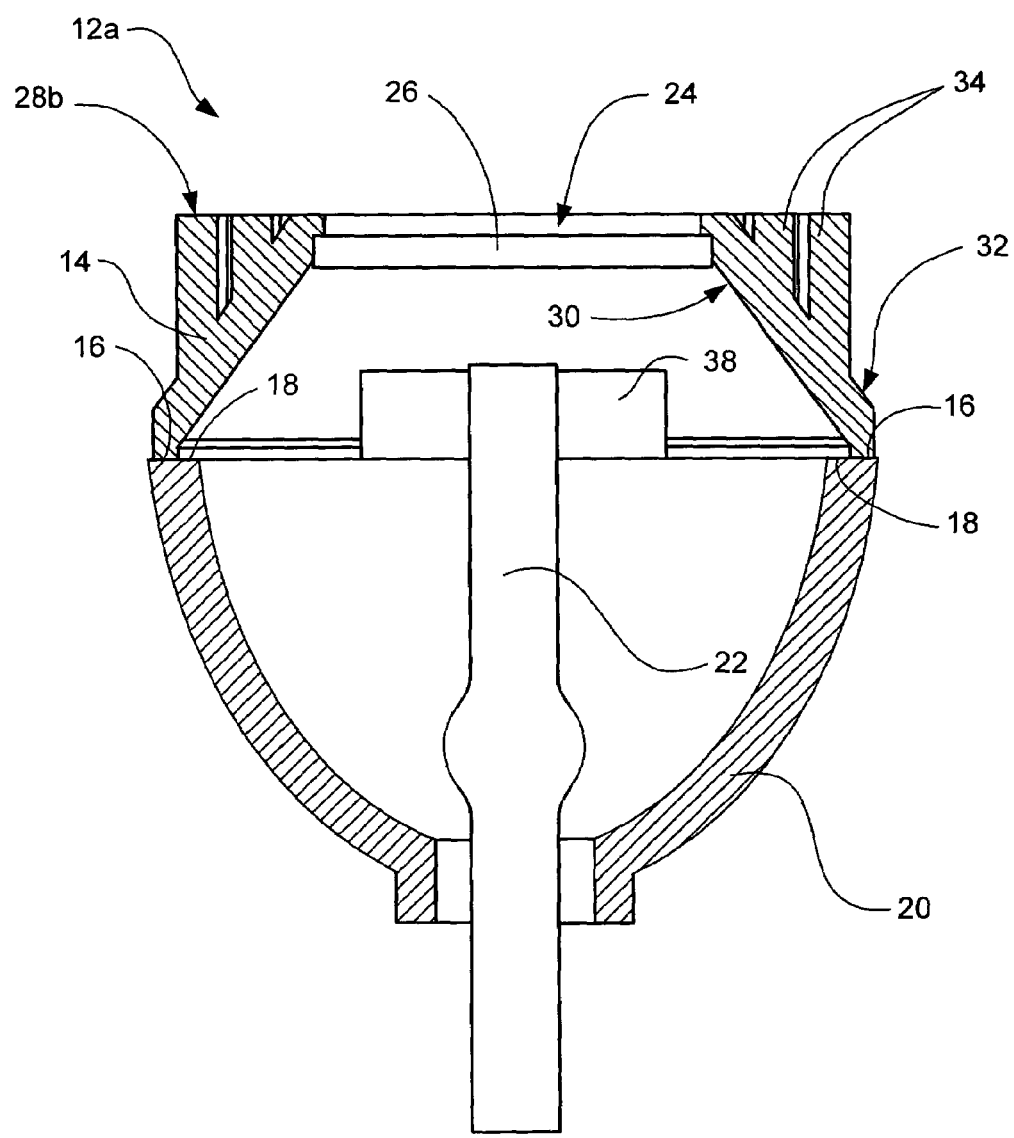
FIG. 3 is a cross-sectional view of the lamp of FIG. 1.
Figure 4:
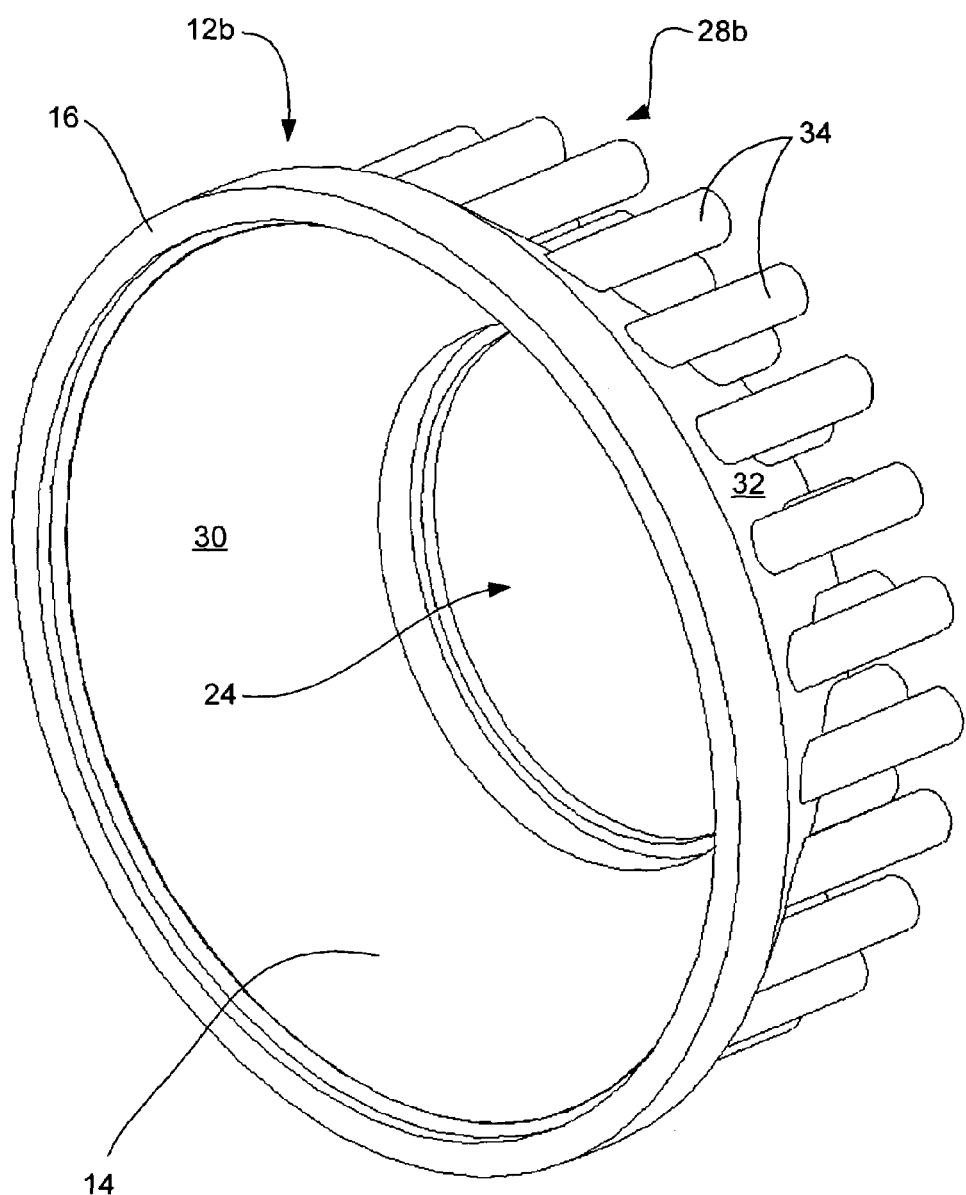
FIG. 4 is a rear perspective view of the nose cone of the lamp of FIG. 1.
Figure 5:
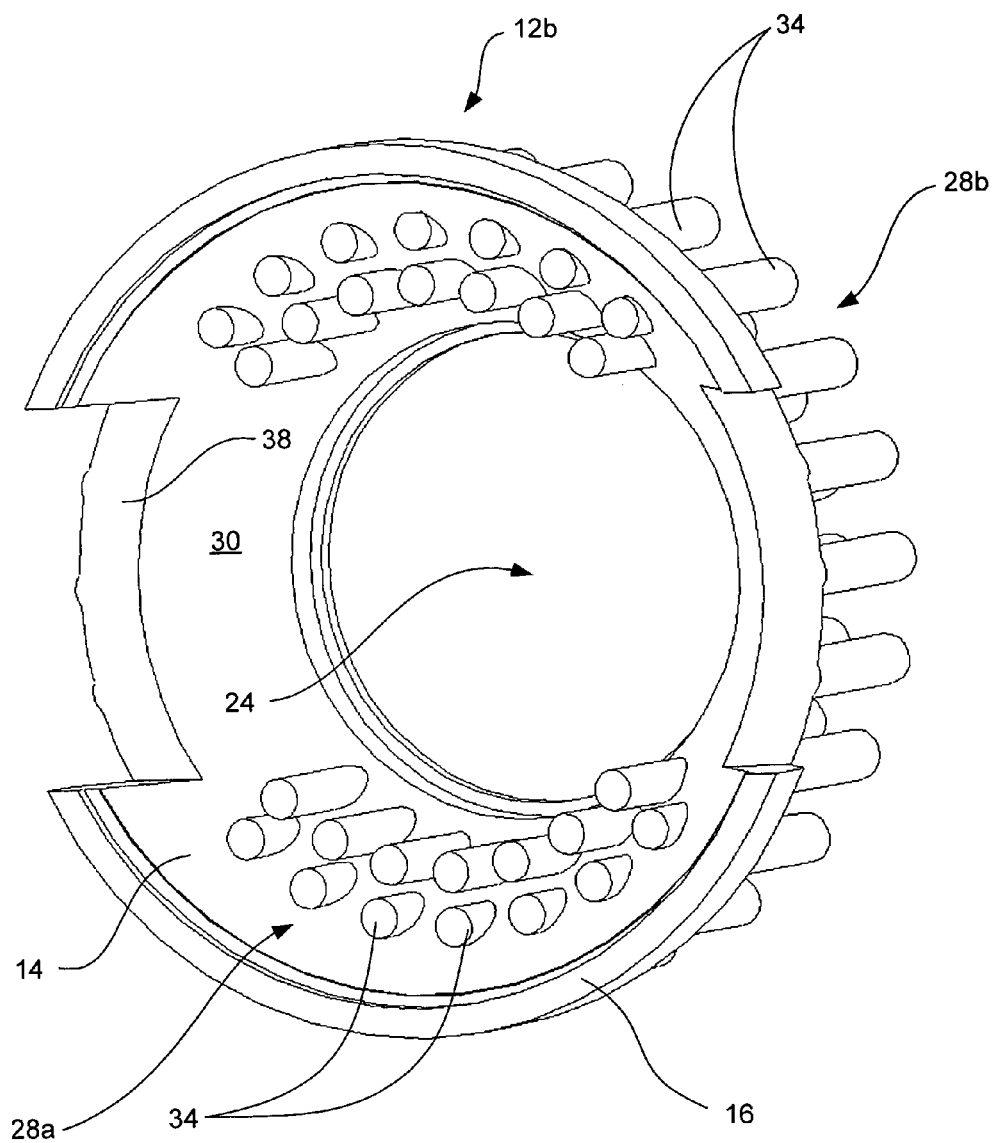
FIG. 5 is a rear perspective view of a nose cone embodiment having thermal projections on its inner surface.
Figure 6:
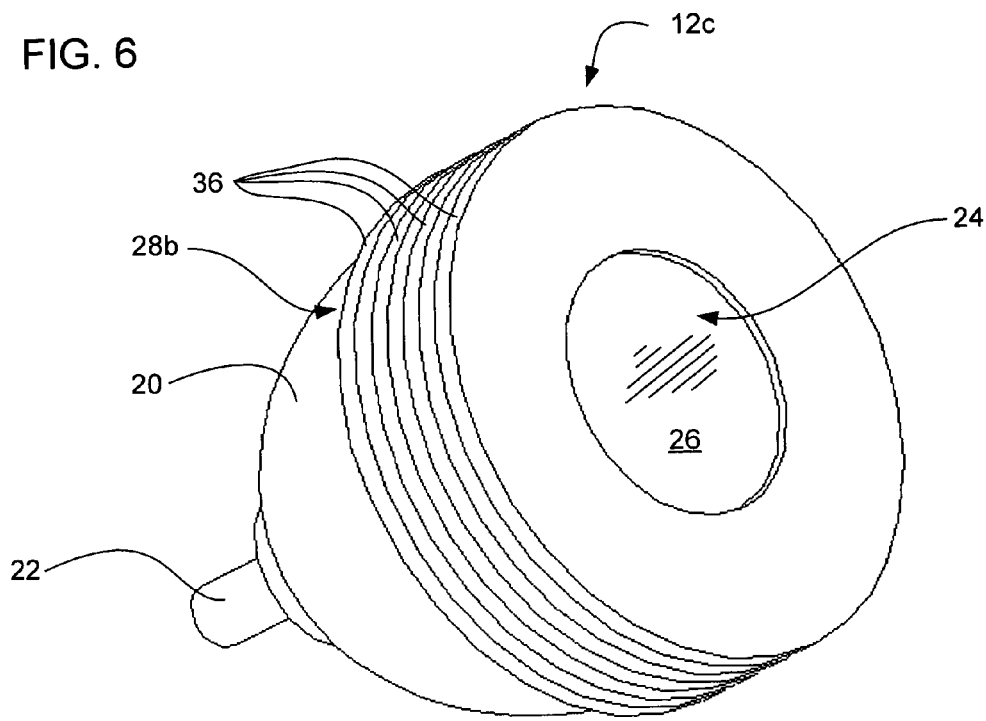
FIG. 6 is a perspective view of another embodiment of a projector lamp having a thermal nose cone.
Figure 7:
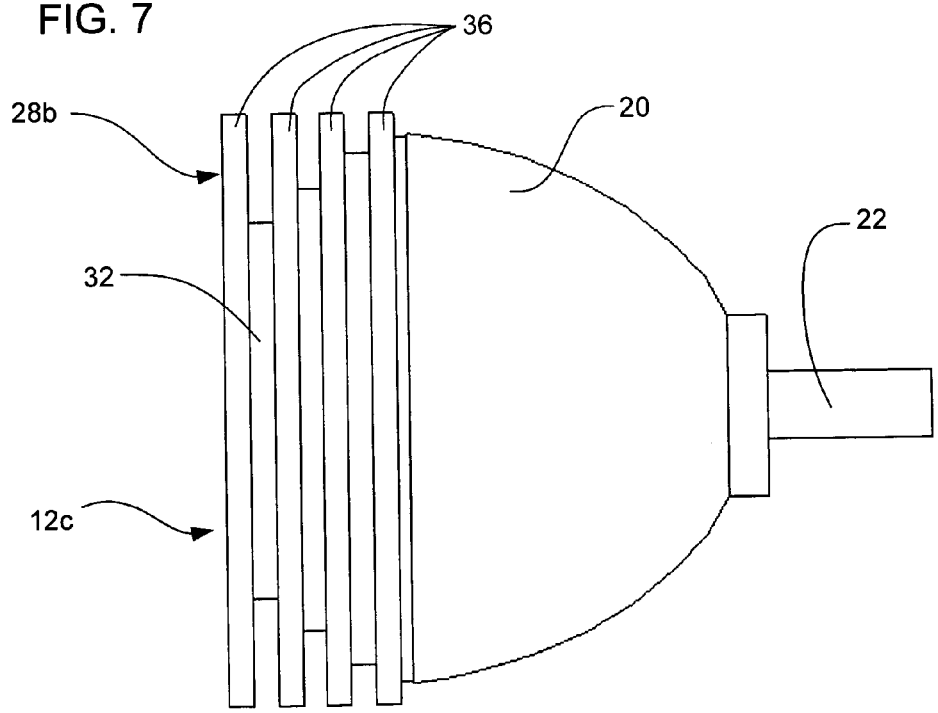
FIG. 7 is a side view of the projector lamp of FIG. 5.

Various embodiments of a heat-dissipating nose cone developed by the inventor, designated generally at 12, are shown in FIGS. 1-7. This nose cone and its method of use help reduce the amount of heat transmitted to the projector as a whole. Shown in FIGS. 1-3 is a lamp 10 having one embodiment 12a of a heat-dissipating nose cone attached thereto. A rear perspective view of this nose cone is shown in FIG. 4. A rear perspective view of another embodiment a nose cone 12b that can be used in the lamp embodiment shown in FIGS. 1-3 is depicted in FIG. 5. Another embodiment of a thermal nose cone 12c is shown in FIGS. 6-7.

Referring to FIGS. 1-4, The nose cone 12a generally includes a shell 14 having a rear edge 16 that can attach to a forward edge 18 of the reflector 20, or to a frame or another component of the projector. Attachment of the nose cone to the reflector can be accomplished through the use of pins and/or threaded fasteners, or by other joining methods such as adhesives. Alternatively, rather than connecting the nose cone directly to the reflector, the nose cone can be disposed at or near the forward edge of the reflector, and connected to a frame or mount within the projector. The nose cone can have a substantially conical shape, as shown, or it can have some other shape, so long as it does not interfere with the projected light. The shell and reflector cooperate with each other to substantially enclose the lamp burner 22. The reflector is typically made of glass. The nose cone can be made from a highly thermally conductive material. Metals, such as aluminum, copper, or magnesium can be used, though other materials can also be suitable.

The shell 14 includes a forward aperture 24 configured to allow passage of light from the lamp. This aperture is clear so as to allow the light to pass through. The aperture can include an optical window 26 mounted in it, which may be configured as a filter, such as an IR/UV filter (performing the function of UV/IR filter 118 in FIG. 8).

The nose cone 12 is provided with various means for absorbing heat from the lamp and dissipating that heat. As one means of dissipating heat, the nose cone can include a plurality of protrusions, designated generally at 28. Such protrusions can include protrusions 28a on the inside surface 30 of the nose cone, as shown in FIG. 5, or protrusions 28b disposed on the outside surface 32 of the nose cone, as shown in FIGS. 1-4 and FIGS. 6-7, or both. These protrusions increase the surface area of the nose cone, and thereby enhance heat transfer through convection between the nose cone and surrounding air, whether inside or outside the lamp, allowing heat to be conducted away from the lamp.

The heat dissipating protrusions 28 can take many configurations, and can be configured in a wide variety of shapes and sizes. For example, the nose cone embodiments depicted in FIGS. 1-5 includes protrusions that are elongate pins 34. In this embodiment, the pins protrude from the nose cone in a substantially forward or rearward direction, but they can be oriented in other directions. Alternatively, in another embodiment shown in FIGS. 6 and 7, a nose cone 12c can include exterior protrusions 28b that are elongate fins 36. In this embodiment, the fins have a generally planar configuration, and substantially radially extend from the nose cone. Other shapes and configurations are also possible, and the direction of the fins need not be radial, but can be in other orientations.

As another means of dissipating heat, the surfaces of the nose cone 12 can be treated so as to modify their reflectivity and/or emissivity of particular wavelengths of radiation. Those skilled in the art will recognize that the terms "reflective" and "reflectivity" are the opposite of "absorptive" or "absorption." A surface that is highly absorptive has low reflectivity, and vice versa. Emissivity refers to the ability of a surface to emit radiation, and emissivity and reflectivity are independent characterisitcs. A highly reflective surface can have either high or low emissivity, and vice versa. With respect to the surface of the lamp nose cone, the terms "treat" or "treatment" are intended to include surface coatings that involve the application of a different material to the nose cone (e.g. paint, dielectrics, etc.), as well as surface treatments that directly modify the material of the nose cone itself (e.g. anodizing, bead blasting, etc.). These various surface treatments can modify the roughness, texture, or chemical composition of the surface in order to affect its reflectivity or emissivity at various wavelengths.

For example, the nose cone 12 can be treated on various surfaces to be more or less absorptive, and/or to be more or less emissive of radiation in particular wavelength ranges. Such treatments are well known in the art. For example, an anodized surface or a bead-blasted aluminum surface or a painted surface can be created to absorb most wavelengths of light that contribute to heating of the lamp and projector. Paint that is black in the range of wavelengths of interest (e.g. in the IR range) will be more absorptive of those wavelengths than paint that appears white in that wavelength range. Similarly, a multi-layered coating, such as of metals like Ti and Cr, or dielectrics such as $TiO_2$ and $SiO_2$, can be applied to absorb light (through interference) in a selective subset of wavelengths, such as from 1-10 μm. Other alternatives are also possible.

Different types of surface treatments will also affect emissivity. Paint and other coatings can vary in their emissivity independent of their reflectivity. For example, a flat paint of a given color (in a particular wavelength range) will tend to be more emissive than a metallic paint of the same color. Emissivity is also affected by the physical or chemical condition of a surface, without applying a different material as a coating. For example, an anodized aluminum surface has an emissivity constant of about 0.770, while highly polished plate aluminum has an emissivity constant in the range of 0.039-0.057. The effects on emissivity of other surface treatments, such as sandblasting, bead-blasting, oxidizing, etc. are well known, and information on emissivity characteristics of different materials is publicly available.

As one example of surface treating in the present case, the inside surface 30 of the nose cone can be treated to be generally highly absorbing at all wavelengths (especially IR wavelengths), so that the nose cones absorbs as much radiation as possible. Alternatively, and more specifically, the inside surface of the nose cone can be treated to be absorptive for infrared radiation in a specific range, such as from 200 nm to 20 μm. At the same time, the emissivity of the interior surface of the nose cone is not critical, and can be high or low, though lower emissivity is probably a more likely choice. The exterior surface 32 of the nose cone can also be treated to have high emissivity, if radiation is to be the dominant heat transfer mechanism. Alternatively, the exterior surface of the cone can be treated to have a poor emitting surface, if convection is intended to be the dominant mode of heat transfer. When radiation is not the dominant heat transfer mechanism, convection takes over. In that case, the emphasis is on efforts to provide heat transfer through convection, such as by providing fans, blowers, etc. The reflectivity of the outside surface of the nose cone is not critical to the heat transfer characteristics of the nose cone in most cases, though it too can be manipulated if desired.

As yet another means for dissipating heat, the nose cone 12 can include one or more vents 38, shown in FIGS. 1-5, disposed in the side of the cone or in some other region, configured to provide air passages that allow air into or out of the lamp cavity. This allows heat to be dissipated through convection from the lamp burner. As in the projection system of FIG. 8, a fan or blower (134 in FIG. 8) can be provided to a supply a flow of cooling air to the nose cone for this purpose, and also to draw heat from the surface of the nose cone and reflector.

It will be apparent that the various protrusion configurations, radiation affective treatments, vents, and other features of the heat-dissipating nose cone described herein can be used together in a wide variety of combinations and configurations other than those shown and described. In its various configurations, the nose cone allows energy emitted from a projector lamp burner to be more readily absorbed, and transferred to surrounding air and removed from the projector box. The nose cone absorbs heat through radiation from the lamp burner, through conduction from the reflector and the burner, and through convection of hot air around the burner. The configuration of the nose cone allows this heat to be conducted outside the lamp, and cooling air from a fan can transfer the heat to the air and take it outside the projector housing, thus helping reduce heat buildup in the projection system.

It is to be understood that the above-referenced arrangements are illustrative of the application of the principles of the present invention. It will be apparent to those of ordinary skill in the art that numerous modifications can be made without departing from the principles and concepts of the invention as set forth in the claims.

What is claimed is:

1. A nose cone for a projector lamp having a lamp burner and a reflector, comprising:
    a metal shell, disposed at a forward edge of the reflector, having a forward aperture configured to allow passage of light from the lamp, the metal shell being configured to cooperate with the reflector to substantially enclose the lamp burner, the metal shell having an interior surface that is treated to be infrared absorbing and low emitting, and an exterior surface that is treated to be highly radiation emitting; and
    a plurality of protrusions extending from the exterior surface of the shell, and a plurality of protrusions extending from the interior surface of the shell, for dissipating heat therefrom.

2. A nose cone in accordance with claim 1, wherein the protrusions comprise elongate fins.

3. A nose cone in accordance with claim 1, further comprising a light filter, disposed in the forward aperture of the nose cone.

4. A nose cone in accordance with claim 1, wherein the protrusions comprise elongate fins.

5. A nose cone in accordance with claim 4, wherein the elongate fins extending from the exterior surface substantially radially extend from the nose cone.

6. A nose cone in accordance with claim 1, wherein a surface treatment of at least one of the interior surface and exterior surface is selected from the group consisting of radiation absorbing and emitting surface coatings, anodizing of the surface, and bead blasting of the surface.

7. A nose cone in accordance with claim 1, further comprising a vent, disposed in a portion of the nose cone, configured to allow air to enter an interior of the lamp.

8. A nose cone in accordance with claim 1, wherein the metal shell is of a material selected from the group consisting of aluminum, copper, and magnesium.

9. A light source for a projection system, comprising:
    a lamp, including a lamp burner and a reflector; and
    a nose cone, attached to a forward portion of the reflector, the nose cone including
        a metal shell, attached to a forward edge of the reflector, having a forward aperture configured to allow passage of light from the lamp, the metal shell having an interior surface that is treated to be infrared absorbing and low emitting, and an exterior surface that is treated to be highly radiation emitting, and being configured to cooperate with the reflector to substantially enclose the lamp burner; and
        a plurality of protrusions extending from the exterior surface of the shell, and a plurality of protrusions extending from the interior surface of the shell, for dissipating heat therefrom.

10. A light source in accordance with claim 9, wherein the protrusions are selected from the group consisting of elongate pins and elongate fins.

11. A light source in accordance with claim 9, wherein a surface treatment of at least one of the interior surface and exterior surface is selected from the group consisting of radiation absorbing and emitting surface coatings, anodizing of the surface, and bead blasting of the surface.

12. A light source in accordance with claim 9, further comprising a light filter, disposed in the forward aperture of the nose cone.

13. A light source in accordance with claim 9, further comprising a vent, disposed in a portion of the nose cone, configured to allow air to enter an interior of the lamp.

14. A light source in accordance with claim 9, wherein the metal shell is of a material selected from the group consisting of aluminum, copper, and magnesium.

15. A method for cooling a projector light source, comprising the steps of:
    substantially enclosing a projector lamp having a lamp burner and reflector with a nose cone attached to a forward portion of the reflector, the nose cone including a plurality of protrusions extending from an interior surface thereof and from an exterior surface thereof, for dissipating heat therefrom;
    treating the interior surface of the nose cone to be infrared absorbing and low emitting;
    treating the exterior surface of the nose cone to be highly radiation emitting; and
    providing a device to cause air to pass over the protrusions of the nose cone to dissipate heat therefrom.

16. A method in accordance with claim 15, further comprising the step of providing a vent in the nose cone, configured to allow the introduction of cooling air into an interior of the projector lamp.

17. A method in accordance with claim 15, wherein the steps of treating the interior and exterior surfaces of the nose cone comprise treating at least one of the interior and exterior surfaces with a treatment selected from the group consisting of coating with radiation absorbing or emitting surface coatings, anodizing of the surface, and bead blasting of the surface.

18. A projection system, comprising:
    a light source, including a lamp, having
        a lamp burner and reflector;
        a nose cone, attached to a forward portion of the reflector, the nose cone comprising
            a metal shell, having a rear edge configured to attach to a forward edge of the reflector, and a forward aperture configured to allow passage of light from the lamp, the metal shell being configured to cooperate with the reflector to substantially enclose the lamp burner, and having an interior surface that is treated to be infrared absorbing and low emitting, and an exterior surface that is treated to be highly radiation emitting; and a plurality of protrusions on the interior surface and exterior surface of the metal shell, for dissipating heat from the nose cone;

a spatial light modulator, configured to produce an image to be projected by the light; and means for projecting the image to a viewing position.

19. A projection system in accordance with claim 18, wherein the protrusions are selected from the group consisting of elongate pins and elongate fins.

20. A projection system in accordance with claim 19, wherein the elongate pins protrude from the nose cone in a substantially forward orientation.

21. A projection system in accordance with claim 19, wherein the elongate fins substantially radially extend from the exterior surface of the nose cone.

22. A projection system in accordance with claim 18, further comprising a light filter, disposed in the forward aperture of the nose cone.

23. A projection system in accordance with claim 18, further comprising a vent, disposed in a portion of the nose cone, configured to allow air to enter an interior of the lamp.

24. A projection system in accordance with claim 18, further comprising a fan, configured to provide a flow of cooling air to the nose cone.

25. A projection system in accordance with claim 18, wherein the nose cone is of aluminum.

26. A projection system in accordance with claim 18, wherein a surface treatment of at least one of the interior surface and exterior surface is selected from the group consisting of radiation absorbing and emitting surface coatings, anodizing of the surface, and bead blasting of the surface.

* * * * *

UNITED STATES PATENT AND TRADEMARK OFFICE
CERTIFICATE OF CORRECTION

PATENT NO. : 7,246,922 B2  Page 1 of 1
APPLICATION NO. : 11/236910
DATED : July 24, 2007
INVENTOR(S) : Kevin Hulick et al.

It is certified that error appears in the above-identified patent and that said Letters Patent is hereby corrected as shown below:

On the Title page, item (56), under "U.S. Patent Documents", in column 2, line 10, delete "McCullough et al." and insert -- Sagal et al. --, therefor.

In column 1, line 40, delete "he" and insert -- the --, therefor.

In column 5, line 46, in Claim 2, after "elongate" delete "fins" and insert -- pins --, therefor.

Signed and Sealed this

Thirtieth Day of September, 2008

JON W. DUDAS
*Director of the United States Patent and Trademark Office*